United States Patent [19]
Graham

[11] Patent Number: 5,978,857
[45] Date of Patent: Nov. 2, 1999

[54] MULTIMEDIA DRIVER HAVING REDUCED SYSTEM DEPENDENCE USING POLLING PROCESS TO SIGNAL HELPER THREAD FOR INPUT/OUTPUT

[75] Inventor: Harry L. Graham, San Jose, Calif.

[73] Assignee: Winnov, Inc., Sunnyvale, Calif.

[21] Appl. No.: 08/898,382

[22] Filed: Jul. 22, 1997

[51] Int. Cl.[6] .............................. G06F 9/46; G06F 13/14
[52] U.S. Cl. .................................. 709/301; 709/7; 710/5; 710/19; 710/46
[58] Field of Search ...................................... 395/681, 839, 395/866; 709/301, 7; 710/19, 46, 5

[56] References Cited

U.S. PATENT DOCUMENTS

| | | | |
|---|---|---|---|
| 5,081,577 | 1/1992 | Hatle ........................................ | 364/200 |
| 5,276,896 | 1/1994 | Rimmer et al. .......................... | 395/800 |
| 5,421,014 | 5/1995 | Bucher .................................... | 395/650 |
| 5,513,328 | 4/1996 | Christofferson ......................... | 395/280 |
| 5,590,288 | 12/1996 | Castor et al. ........................ | 395/200.03 |

OTHER PUBLICATIONS

"Programming Interface for Asynchronous communications in a Multitasking Operating System," IBM Technical Disclosure Bulletin, vol. 31, No. 1 pp. 313–314, Jun. 1998.

"Polling Method for Data Transmission in a Multitasking Operating System,"IBM Technical Disclosure Bulletin, vol. 38 No. 06 pp. 489–490, Jun. 1995.

"Videum AV", Winning Through Innovation, 1996, Winnov LP.

Microsoft Windows NT Version 4.0 Device Driver Kit, 1996.

*Primary Examiner*—Thomas C. Lee
*Assistant Examiner*—Albert Wang
*Attorney, Agent, or Firm*—D'Alessandro & Ritchie

[57] ABSTRACT

An enhanced multimedia device driver for personal computers includes a polling process which performs polling of the hardware devices. The device driver creates a helper thread for each hardware device which executes in the client context. Each polling process wakes up at a regular interval at which time it polls the status register of the corresponding hardware device. If there is an event pending at the status register, then the polling process signals the event pending to all of the helper threads. Each helper thread wakes up and checks the reason for the wakeup. At this point, the helper thread will initiate a data transfer using programmed I/O if called for by the reason for the wakeup. Through the use of the present invention, the DMA controller, the system interrupt controller, and the kernel interrupt handler of the kernel are not employed in data transfers and the use of DMAs and/or IRQs for data transfers is eliminated.

8 Claims, 5 Drawing Sheets

MULTIMEDIA DRIVER HAVING REDUCED SYSTEM DEPENDENCE USING POLLING PROCESS TO SIGNAL HELPER THREAD FOR INPUT/OUTPUT

BACKGROUND OF THE INVENTION

1. Field of the Invention

This invention relates to the field of hardware device drivers for computers. More specifically, this invention relates to enhanced multimedia drivers for personal computers.

2. The Background Art

The operating system of a computer is the software program responsible for controlling and administering all of the hardware resources present in the system. The operating system is to be understood as the control program of the computer. It is through the basic set of services provided by the operating system that hardware devices can be brought into a computer system, used by an operating system, and exploited by other system services or by application programs. Thus, the role of an operating system is to define, provide, and administer all the basic system facilities, or system services, that are present in the computer system. These system facilities are the building blocks for all other system services and for application programs.

The system facilities offered by an operating system are normally exported to the rest of the system through a set of software functions named system calls. There are different manners in which system calls are implemented, yet their use is rather standard. Application programs issue the calls as if they were part of the application program itself. To application programs, system calls appear as functions provided by the environment.

Operating systems have evolved from being one-of-a-kind programs useful for only one type of hardware configuration to being portable programs that can be made to operate in a homogenous family of hardware configurations and even in heterogenous hardware platforms.

The services provided by operating systems vary depending on the intended use of the computer. Early operating systems were designed to only perform one task at a time, whereas current operating systems may be capable of doing several tasks concurrently. The latter is called a multitasking operating system for this reason. The advantage of multitasking systems is that the user may have several different kinds of activities happening at once and thus users can make better use of time and resources while getting work done.

The services provided by an operating system can be organized in categories. Four possible categories are task control, file manipulation, information maintenance, and device manipulation. Task control has all of the services needed to administer tasks, such as initiation and termination of a task, as well as services that may control the coordination of activities between tasks.

File manipulation services are used to organize and access the data of users in files. File manipulation in advanced systems can be quite complex as there may be different kinds of files to optimize data availability or access time performance. Information maintenance is an important category of services that tracks information on various aspects of a system and helps administer the resources present in the system.

Device manipulation services provide the ability to communicate with and between devices in a system. The software in an operating system that directly accesses a hardware device is called a device driver.

The organization of the structure of operating systems has also evolved over the years from being a monolithic set of system services whose boundaries were difficult to establish to being a structured set of system services with clear boundaries between them. Today, for example, some of these services, like the file system in charge of administering the file data stored by users, have boundaries, or software interfaces, that are standards regulated by organizations that are not related to any computer vendor. This modularization of operating systems into well-understood components provides the possibility to "mix and match" components from different vendors in one system. For example, hardware device manufacturers will often provide device drivers for use with their particular hardware devices.

Current operating systems are all based on the idea of building higher-level hardware abstractions from lower-level hardware-oriented function. In other words, current operating systems build higher-level abstractions from lower-level functions that are closer to the raw hardware. Thus, all kinds of hard disks, for example, are made to look and operate in the same manner by their low-level device drivers. Then, in turn, the operating system presents, with all other services in the system (such as the file system), a uniform, common view of a hard disk.

All computer systems have a base set of hardware components that need to be administered by the operating system. These components are the building set for all computing that can be done in the machine. For example, most current personal computers have a keyboard, a pointing device or mouse, a high-resolution screen, an internal clock, a phone modem, a diskette reader, and a hard disk.

The kernel of an operating system is the most basic set of services needed to build the computer system. The kernel always contains the interrupt handler, the task manager, and the interprocess communication manager. Sometimes it may contain the virtual memory manager and the network subsystem manager. With these services the system can operate all of the hardware present in the system and also coordinate the activities between tasks. Using these services, subsystems such as the file system and the network system can build their services. Application programs can then provide their function by using these subsystems.

There are any number of operating system programs available on the market today. Among them are UNIX, OS/2, and MacOS, but those of ordinary skill in the art will recognize that the dominant force in the operating system software market for personal computers is Microsoft Corporation of Seattle, Wash. Their MSDOS and Windows series of programs have seized a majority of the personal computer market. Their Windows NT (WinNT) operating system is the latest in the family of Windows programs that includes Windows 3.x (Win3.x) and Windows 95 (Win95). A detailed description of the device driver portion of the WinNT operating system is available from Microsoft Windows NT Version 4.0 Device Driver Kit 1996 which is hereby incorporated by reference as if set forth fully herein.

In general, an attempt is made by software programmers to make newer versions of software backward compatible with previous versions of software. This is the case with Win3.x and Win95 where application programs that were designed to run on machines equipped with the older Win3.x software will typically still run on machines equipped with the newer Win95 software. Of course, application programs designed specifically to run on Win95 equipped machines should exhibit some enhanced capability (i.e. speed or function) over their Win3.x designed counterparts, but the Win95 original application programs may not be able to run on Win3.x equipped machines.

This general preference for backward compatibility of newer software with previous software has not been observed with respect to WinNT however. WinNT contains some significant departures from previous software with the consequence that application programs may be designed specifically to run on WinNT equipped machines that will not run on either Win3.x or Win95 equipped machines and application programs may be designed to run on either Win3.x and Win95 equipped machines that will not run on WinNT equipped machines.

In particular, WinNT contains significant departures from either Win3.x or Win95 in the area of multimedia drivers. A multimedia driver provides access by any of a number of system services and application programs to any of a number of audio or video hardware sources depending on the particular context. The application programs may include video conferencing, video phone, audio or video recording, editing, and playback, etc. The hardware sources may include microphones, speakers, cameras, VCRs, video disk players, etc. From the point of view of the multimedia driver, the system service or application program that desires access to the hardware is called a client or client process.

One such departure of WinNT from Win3.x and Win95 is in the manner of communication between system resources. As part of the organization of the system resources, the operating system allocates an address space and a portion of memory to each application program and each driver. Among other things, this facilitates communication between the system resources. In message-passing systems for inter-process communications, the sender builds a message in an area of memory allocated to it and then contacts the operating system to send the message to the recipient. The operating system is then put in charge of delivering the message to the recipient.

Under Win3.x and Win95, the system reduces overhead in the message delivery process by avoiding copying the message from the sender to the kernel and then to the receiver. This is accomplished by providing a means by which the receiver can read the message directly from where the sender wrote it. This mechanism requires that the operating system intervene if the sender wants to modify the contents of a message before the recipient has gone through its content. For example, this allows multiple clients to execute in the single address space of the multimedia driver.

Under WinNT however, the system does not support the reduced overhead message delivery process of Win3.x and Win95. Each system resource can execute only within their own address space. As a result, for example, the system must implement a method to transfer messages to multiple separate client address spaces rather than allow the multiple clients to read directly from the single driver address space.

Another such departure of WinNT from Win3.x and Win95 is in the implementation of the multimedia timer services. Multimedia timer services allow an application to schedule and receive timer events at application-specified intervals within very fine resolution. There are two types of timer events: single and periodic. A single timer event occurs once, after a specified number of milliseconds. A periodic timer event occurs every time a specified number of milliseconds elapses. The interval between periodic events is called an event delay.

Empirically, it has been found that the multimedia timer services for WinNT are neither as accurate nor as reliable as those for Win3.x and Win95. Exactly why is not fully understood, but the conclusion that must be drawn is that the multimedia timer services implementation must be different from Win3.x and Win95 to WinNT resulting in the variation in performance. The variation was found to be great enough that the desired fine grain process control is not achievable through use of the multimedia timer services under WinNT as it is under Win3.x and Win95.

As a consequence of these departures, multimedia drivers designed for Win3.x and Win95 will not work for WinNT. Conventional multimedia drivers for WinNT do contain many of the same elements as those for Win3.x and Win95, but they differ in the details. As a result of the differences between the multimedia drivers for Win3.x and Win95 and those for WinNT, the remainder of the disclosure contained herein will focus on multimedia drivers for WinNT to the exclusion of those for Win3.x and Win95 unless otherwise noted. However, this focus on multimedia drivers for WinNT should not be construed to exclude the fact that the inventive concepts disclosed herein may also be applied to other device drivers for other operating systems similar to WinNT either existing now or in the future. Those of ordinary skill in the art will recognize such applications and appreciate that they are to be considered within the scope of the inventive concept disclosed herein.

Figure 1:
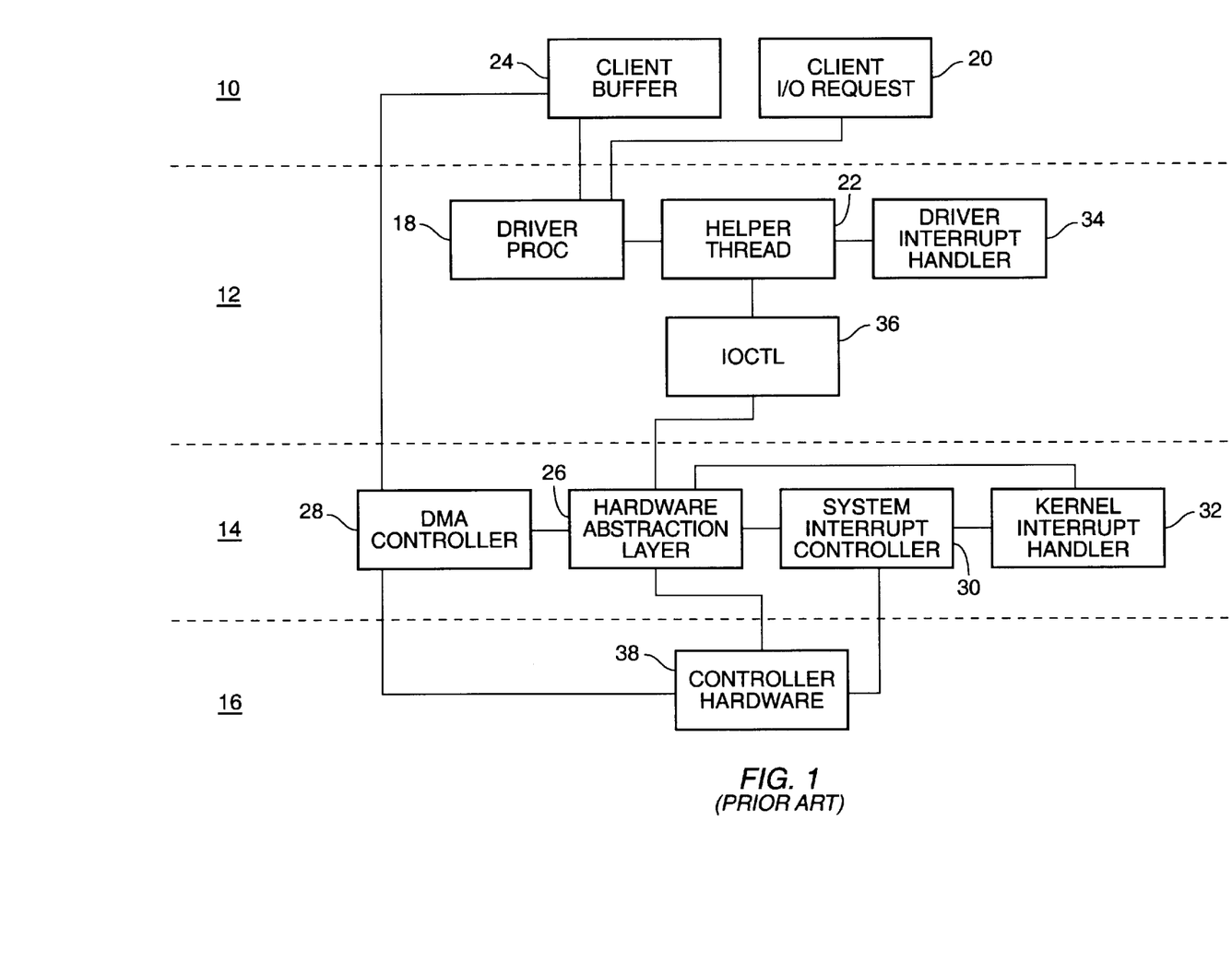
FIG. 1 is a block diagram of a conventional device driver architecture for performing single buffer data transfer.

Turning to FIG. 1, a block diagram of a conventional device driver architecture for performing data transfer is shown. The simplest form of data transfer is the transfer of a single buffer of data. The single buffer data transfer illustrated by the following description is that of a transfer from a hardware device to an application program, but those of ordinary skill in the art will recognize that a transfer from the application program to the hardware device can be accomplished in a similar manner.

Recall that from the point of view of a device driver, the system service or application program that desires access to the hardware is called a client or client process. Correspondingly, FIG. 1 is divided into four regions by three dashed lines. The top region is the client process 10. The second region is the device driver 12. The third region is the kernel 14. The bottom region is the hardware device 16. As will be recognized by those of ordinary skill in the art, the various elements represented as blocks in FIG. 1 correspond to hardware, software, or both depending on the particular block in question. It will be further recognized that the lines connecting the various blocks represent signal paths between the various elements which correspond to electrical conductors such as dedicated wiring, bus wiring, traces on a circuit board, etc. The signal paths may be unidirectional or bi-directional depending on the particular blocks in question.

Those of ordinary skill in the art will recognize that the regional divisions shown in FIG. 1 are not nearly as distinct in actual implementation in the sense that although some of the elements may be shown as part of one region, that element may operate in the context of another region. For example, as part of the system installation of a device driver 12, a portion of programming language called driver process methods (DriverProc) 18 is inserted into the client process context. This DriverProc 18 provides an interface between the system resources including the device driver 12 and the client process 10. It is in this way that the details of the system services all appear transparent to the client process 10 as discussed above.

A conventional single buffer data transfer begins when a client input/output (I/O) request 20 of the client process 10 issues a command to the device driver 12 through the DriverProc 18 to provide the client process 10 with a buffer of data. A buffer of data contains a plurality of words of data and is ultimately limited by the available memory resources. While the requested data is being transferred from the hardware device 16 to a client buffer 24 where it will be eventually accessed by the client process 10, the client I/O request 20 must be blocked until the transfer is complete.

To perform the client I/O request 20, first, the client buffer 24 must be page locked in system memory to prevent movement of the pages of memory containing the buffer to be transferred until the client process 10 has had a chance to read them. Second, the DriverProc 18 creates the helper thread 22 in the client context which performs asynchronous activities on behalf of the client process 10. Third, the helper thread 22 issues commands through a hardware abstraction layer 26 to a Direct Memory Access (DMA) DMA controller 28 to prepare data transfer and to a system interrupt controller 30 to enable reporting of an interrupt condition which will signal completion of the data transfer. The hardware abstraction layer 26 is a portion of the operating system which presents a consistent view of hardware functions to the application software to hide the differences among the various hardware implementations. Fourth, the helper thread 22 issues commands to the kernel interrupt handler 32 instructing it to dispatch to the driver interrupt handler 34 at the completion of data transfer. Upon completion of these steps, the client I/O request 20 remains blocked until the helper thread 22 receives the report of the interrupt condition which will signal completion of the data transfer.

Now the requested data can be transferred from the hardware device 16 to the client process 10. First, the helper thread 22 issues commands to set up the data transfer through an I/O control method (IOCTL) 36 to controller hardware 38 within the hardware device 16 which provides access to a buffer (not shown) where the requested data is stored. This IOCTL 36 provides an interface amongst the system resources including the device driver 12, the kernel 14, and the hardware device 16. Second, the DMA controller 28 transfers the requested data from the controller hardware 38 to the client buffer 24. On a word by word basis, the controller hardware 38 notifies the DMA controller 28 that data is ready to be transferred by asserting a request line and, in response, the DMA controller 28 informs the controller hardware 38 of the timing of the transfer by asserting an acknowledge line.

When all of the requested data has been transferred from the hardware device 16 to the client process 10, the client I/O request 20 has to be unblocked and the page lock on the client buffer 24 has to be removed. First, the controller hardware 38 asserts an interrupt request line to the system interrupt controller 30. Second, the system interrupt controller 30 sends an interrupt signal to the kernel interrupt handler 32 which in turn acknowledges control by the system interrupt controller 30. Third, the kernel interrupt handler 32 dispatches an interrupt signal to a driver interrupt handler 34 which in turn acknowledges the interrupt signal when the device driver 12 gets to a state where the device driver 12 can process additional interrupts. Fourth, the driver interrupt handler 34 signals completion of the data transfer by reporting an interrupt condition to the helper thread 22 and then the driver interrupt handler 34 relinquishes control to the device driver 12 which resumes the interrupted process. Finally, the helper thread 22 unblocks the client I/O request 20 and the page lock on the client buffer 24 is removed.

The conventional single buffer data transfer just described is useful in situations when only a small quantity of data needs to be transferred. However, those of ordinary skill in the art will realize that although repeated use of the single buffer transfer can be used for transfer of a larger number of buffers, it is not very efficient for that purpose. Therefore, for transfer of a group or stream of buffers, a different method is used. A conventional stream data transfer illustrated by the following description is that of a transfer from a hardware device to an application program, but those of ordinary skill in the art will recognize that a transfer from the application program to the hardware device can be accomplished in a similar manner.

Figure 2:
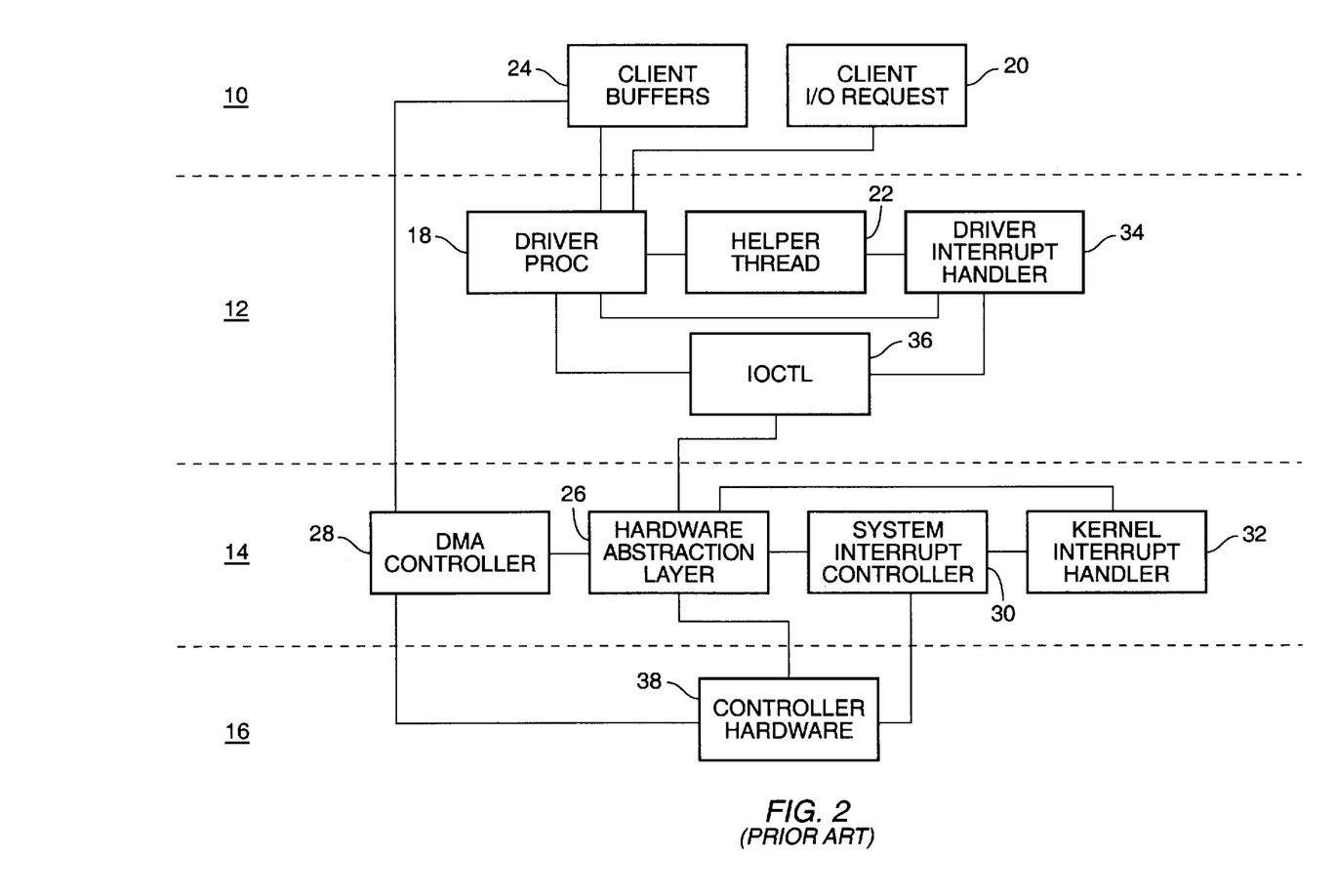
FIG. 2 is a block diagram of a conventional device driver architecture for performing stream data transfer.

Turning now to FIG. 2, a conventional stream data transfer begins when the client I/O request 20 of the client process 10 issues a prepare buffers command to the device driver 12 through the DriverProc 18 to prepare a number of buffers for streaming mode transfer with the client process 10. In response, the DriverProc 18 page locks memory space in the client buffers 24 and the client I/O request 20 gives the DriverProc 18 the order of the queued buffers (not shown) in the client buffers 24. At this point the device driver 12 is prepared for streaming mode transfer but does not actually transfer data yet.

To begin the actual transfer of data, the client I/O request 20 of the client process 10 issues a start streaming command to the device driver 12 through the DriverProc 18. The number of buffers of data may be indeterminate at the time of the command. In such an instance, the command is simply that the device driver 12 should provide buffers of data to the client process 10 until the client process 10 commands the device driver 12 to stop streaming. Upon receiving the start streaming command, the DriverProc 18 first creates the helper thread 22 in the client context and second issues priming commands to the IOCTL 36 and through the hardware abstraction layer 26 to the DMA controller 28 to prepare for data transfer and to the system interrupt controller 30 to enable reporting of an interrupt condition which will signal completion of the transfer of each buffer of the data. The IOCTL 36 in turn issues commands to the controller hardware 38 which provides access to the buffers (not shown) where the requested data is stored.

Now the requested data can be transferred from the hardware device 16 to the client process 10. First, the DMA controller 28 transfers the requested data from the controller hardware 38 to the client buffer 24. On a word by word basis for each buffers of data, the controller hardware 38 notifies the DMA controller 28 that data is ready to be transferred by asserting a request line and, in response, the DMA controller 28 informs the controller hardware 38 of the timing of the transfer by asserting an acknowledge line. Second, when each buffer of the requested data has been transferred, the controller hardware 38 asserts an interrupt request line to the system interrupt controller 30. Third, the system interrupt controller 30 sends an interrupt signal to the kernel interrupt handler 32 which in turn acknowledges control by the system interrupt controller 30. Fourth, the kernel interrupt handler 32 dispatches an interrupt signal to the driver interrupt handler 34 which in turn acknowledges the interrupt signal when the device driver 12 gets to a state where the device driver 12 can process additional interrupts. Fifth, the driver interrupt handler 34 issues subsequent commands to the client buffers 24, the IOCTL 36, and through the hardware abstraction layer 26 to the DMA controller 28 and the system interrupt controller 30 to initiate the next data transfer operation. If all of the client buffers 24 are full, then this action is postponed until space becomes available. Sixth, the driver interrupt handler 34 signals completion of the transfer of each buffer of data by reporting an interrupt condition to the helper thread 22 and then the driver interrupt handler 34 relinquishes control to the device driver 12 which resumes the interrupted process. Finally, the helper thread 22 notifies the client process 10 that the transfer is complete.

The process of transferring buffers repeats itself until the client process 10 issues a stop streaming command to the device driver 12 through the DriverProc 18 to terminate providing the client process 10 with a stream of data. The DriverProc 18 then disables the driver interrupt handler 34 from issuing subsequent commands for continued data transfer. Finally, the client process 10 issues an unprepare buffers command to the device driver 12 and the page lock on the client buffers 24 is removed.

In both the conventional single buffer data transfer and the conventional stream data transfer described above, the data transfer is accomplished with the help of the DMA controller 28 and the system interrupt controller 30. Those of ordinary skill in the art will recognize that the use of DMAs and IRQs (interrupt requests) can be problematical for a number of reasons. First, DMAs and IRQs are scarce resources within the personal computer. Second, configuration of DMA and IRQ resources can be troublesome even in plug and play systems. Third, variations in DMA channel implementations exist between personal computer manufacturers which can create incompatibilities. Fourth, DMA channel performance is system implementation dependent which can result in unacceptably low performance.

OBJECTS AND ADVANTAGES OF THE INVENTION

Accordingly, it is an object and advantage of the present invention to provide improved multimedia drivers for personal computers which do not rely on DMAs and IRQs for their implementation.

It is a further object and advantage of the present invention to provide improved drivers for personal computers which require less hardware because they do not rely on DMAs and IRQs for their implementation.

These and many other objects and advantages of the present invention will become apparent to those of ordinary skill in the art from a consideration of the drawings and ensuing description of the invention.

SUMMARY OF THE INVENTION

An enhanced multimedia device driver for personal computers includes a polling process which performs polling of the hardware devices. The device driver creates a helper thread for each hardware device which executes in the client context. Each polling process wakes up at a regular interval at which time it polls the status register of the corresponding hardware device. If there is an event pending at the status register, then the polling process signals the event pending to all of the helper threads. Each helper thread wakes up and checks the reason for the wakeup. At this point, the helper thread will initiate a data transfer using programmed I/O if called for by the reason for the wakeup. Through the use of the present invention, the DMA controller, the system interrupt controller, and the kernel interrupt handler of the kernel are not employed in data transfers and the use of DMAs and/or IRQs for data transfers is eliminated.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 3:
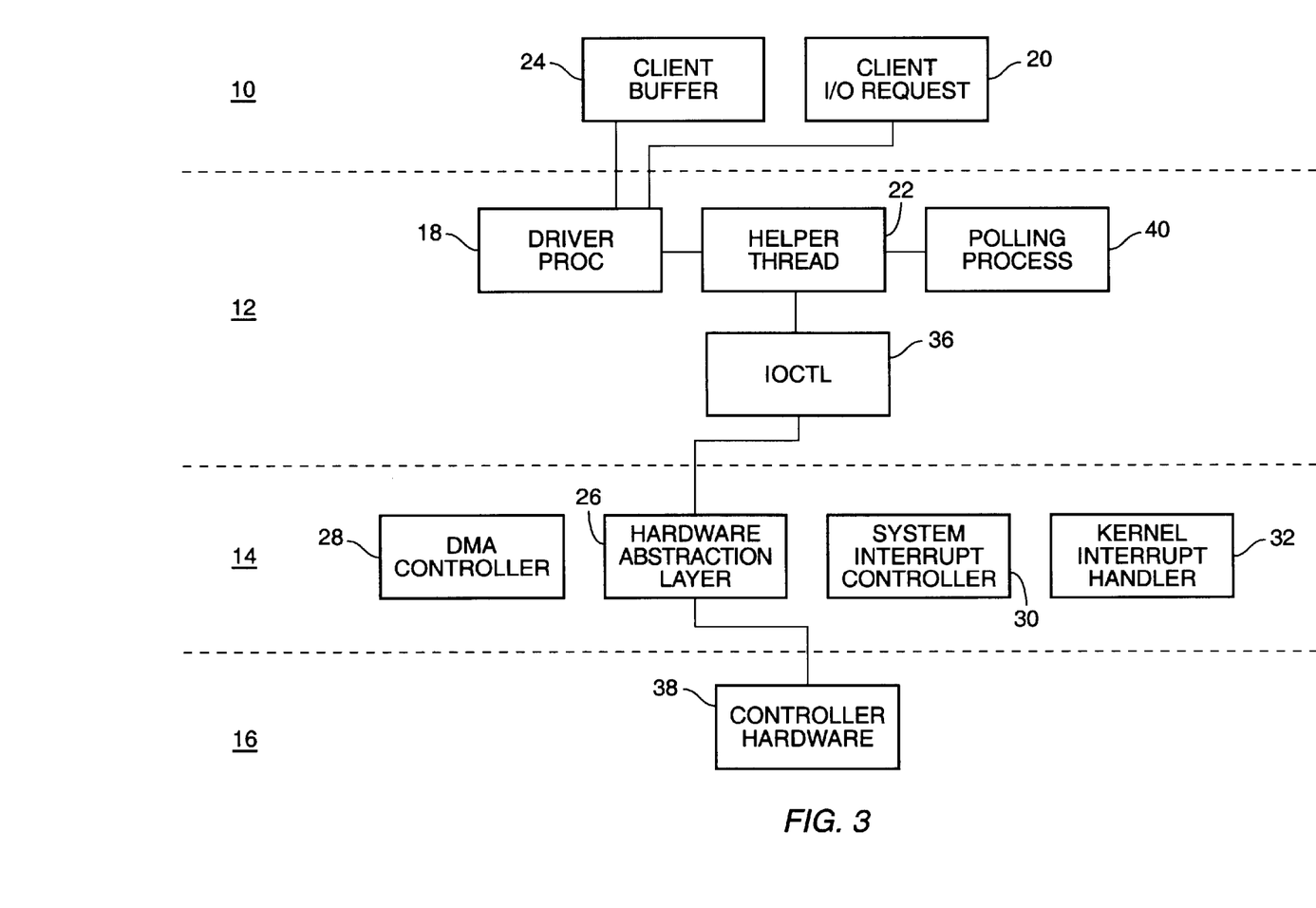
FIG. 3 is a block diagram of a first preferred embodiment of an enhanced device driver architecture for performing single buffer data transfer according to the present invention.

Turning now to FIG. 3, a block diagram of a first preferred embodiment of an enhanced device driver architecture for performing single buffer data transfer according to the present invention is shown. The single buffer data transfer illustrated by the following description is that of a transfer from a hardware device to an application program, but those of ordinary skill in the art will recognize that a transfer from the application program to the hardware device can be accomplished in a similar manner.

As above, a single buffer data transfer begins when the client input/output (I/O) request 20 of the client process 10 issues a command to the device driver 12 through the DriverProc 18 to provide the client process 10 with a buffer of data. The DriverProc 18 in turn creates the helper thread 22 in the client context.

The helper thread 22 performs a number of asynchronous activities on behalf of the client process 10. The helper thread 22 registers the command to provide a buffer of data with a polling process 40 so that the polling process 40 is ready for data transfer. Next the helper thread 22 issues priming commands to the IOCTL 36 which in turn checks that the buffer (not shown) of the controller hardware 38 contains any data for transfer. At the prescribed regular interval, the polling process 40 wakes up and polls the helper thread 22 to check that data is ready to transfer. The helper thread 22 in turn polls the IOCTL 36 for the data. Finally the data is transferred from the controller hardware 38 to the client buffer 24 where the data is accessed by the client process 10.

It is significant to note that through the use of the present invention, the DMA controller 28, the system interrupt controller 30, and the kernel interrupt handler 32 of the kernel 14 are not employed in the data transfer. The advantage being that the use of DMAs and/or IRQs for this data transfer is eliminated.

Similar to the above, the single buffer data transfer just described is useful in situations when only a small quantity of data needs to be transferred. Therefore, for transfer of a group or stream of buffers, a different method is used. The stream data transfer according to the present invention illustrated by the following description is that of a transfer from a hardware device to an application program, but those of ordinary skill in the art will recognize that a transfer from the application program to the hardware device can be accomplished in a similar manner.

Figure 4:
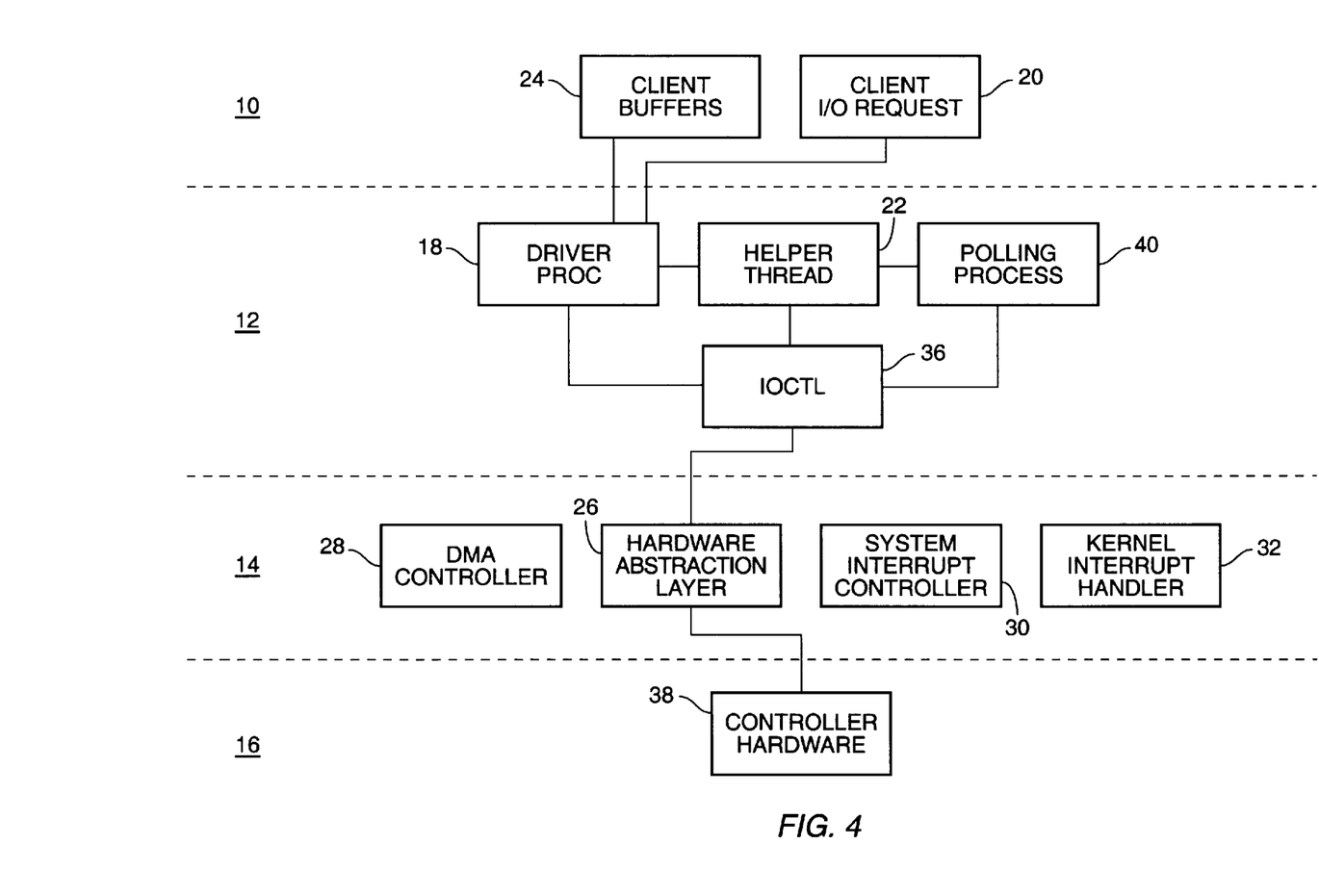
FIG. 4 is a block diagram of a preferred embodiment of an enhanced device driver architecture for performing unidirectional stream data transfer according to the present invention.

Turning now to FIG. 4, a block diagram of a preferred embodiment of an enhanced device driver architecture for performing unidirectional stream data transfer according to the present invention is shown.

As above, a stream data transfer begins when the client I/O request 20 of the client process 10 issues a prepare buffers command to the device driver 12 through the DriverProc 18 to prepare a number of buffers for streaming mode transfer with the client process 10. In response, the DriverProc 18 page locks memory space in the client buffers 24 and the client I/O request 20 gives the DriverProc 18 the order of the queued buffers (not shown) in the client buffers 24. At this point the device driver 12 is prepared for streaming mode transfer but does not actually transfer data yet.

To begin the actual transfer of data, the client I/O request 20 of the client process 10 issues a start streaming command to the device driver 12 through the DriverProc 18. The number of buffers of data may be indeterminate at the time of the command. In such an instance, the command is simply that the device driver 12 should provide buffers of data to the client process 10 until the client process 10 commands the device driver 12 to stop streaming. Upon receiving the start streaming command, the DriverProc 18 first creates the helper thread 22 in the client context and second issues priming commands to the IOCTL 36. The IOCTL 36 in turn issues commands to the controller hardware 38 which provides access to the buffers (not shown) where the requested data is stored.

Now the requested data can be transferred from the hardware device 16 to the client process 10. At a prescribed regular interval, the polling process 40 wakes up and polls the controller hardware 38 to check that data is ready to transfer. When the polling process 40 finds that data is ready, it wakes up the helper thread 22. The helper thread 22 in turn polls the IOCTL 36 for the data. Finally the data is transferred from the controller hardware 38 to the client buffers 24 where the data is accessed by the client process 10. Next, the helper thread 22 issues subsequent commands to the client buffer 24 and the IOCTL 36. If all of the client buffers 24 are full, then this action is postponed until space becomes available. Finally, the helper thread 22 notifies the client process 10 that the transfer is complete.

The process of transferring buffers repeats itself until the client process 10 issues a stop streaming command to the device driver 12 through the DriverProc 18 to terminate providing the client process 10 with a stream of data. The DriverProc 18 then disables the helper thread 22 from issuing subsequent commands for continued data transfer. Finally, the client process 10 issues an unprepare buffers command to the device driver 12 and the page lock on the client buffers 24 is removed.

Again, it is significant to note that through the use of the present invention, the DMA controller 28, the system interrupt controller 30, and the kernel interrupt handler 32 of the kernel 14 are not employed in the data transfer. The advantage being that the use of DMAs and/or IRQs for this data transfer is eliminated.

The above example demonstrates a stream data transfer that is uni-directional meaning while one of the client process 10 or the hardware device 16 is transmitting the other is receiving. There are situations however when it is desirable to have bi-directional data transfer meaning that both the client process 10 and the hardware device 16 are transmitting and receiving at the same time. Alternatively, it is possible that two client processes are running with one transmitting and the other receiving and the hardware device is receiving and transmitting respectively. Bi-directional communication of course requires a greater degree of coordination. The stream data transfer according to the present invention illustrated by the following description is that of transfers between a hardware device and one application program, but those of ordinary skill in the art will recognize that transfers between multiple application programs and the hardware device can be accomplished in a similar manner.

Figure 5:
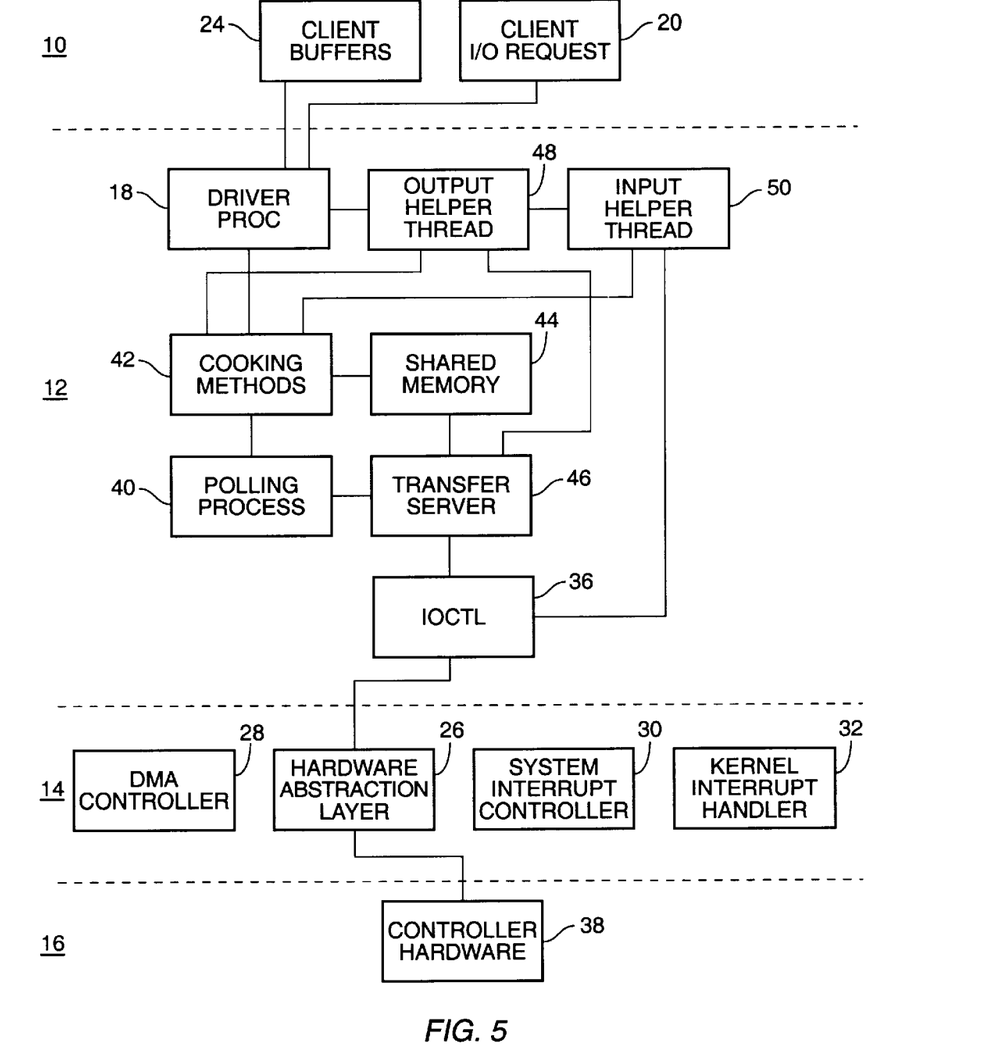
FIG. 5 is a block diagram of a preferred embodiment of an enhanced device driver architecture for performing bidirectional stream data transfer according to the present invention.

Turning now to FIG. 5, a block diagram of a preferred embodiment of an enhanced device driver architecture for performing bi-directional stream data transfer according to the present invention is shown.

As above, a stream data transfer begins when the client I/O request 20 of the client process 10 issues a prepare buffers command to the device driver 12 through the DriverProc 18 to provide the client process 10 with a number of buffers for streaming mode transfer. In this case however, no action is required of the device driver 12 since all access to the client buffers 24 will be performed through the client context. Next the client I/O request 20 gives the DriverProc 18 the order of the queued buffers (not shown) in the client buffers 24. At this point the device driver 12 is prepared for streaming mode transfer but does not actually transfer data yet.

To begin the actual transfer of data, the client I/O request 20 of the client process 10 issues a start streaming command to the device driver 12 through the DriverProc 18. The number of buffers of data may be indeterminate at the time of the command. In such an instance, the command is simply that the device driver 12 should provide buffers of data to the client process 10 until the client process 10 commands the device driver 12 to stop streaming. Upon receiving the start streaming command, the DriverProc 18 enables cooking methods 42 which coordinate data transfer using a shared memory 44.

Now the requested data can be transferred between the hardware device 16 and the client process 10. At the prescribed regular interval, the polling process 40 wakes up and polls a transfer server 46 to check that data is ready to transfer. All data transfers take place in the context of the transfer server 46. The transfer server 46 in turn polls the IOCTL 36 for the data. When data is ready, it is transferred from the controller hardware 38 to the shared memory 44. Then the transfer server 46 signals an input helper thread 50 to cause it to cook the data from the shared memory 44 to the client buffers 24 through the cooking methods 42. The input helper thread 50 notifies the client process 10 through the client I/O request 20 when the transfer is complete. Next, the transfer server 46 issues subsequent commands to the controller hardware 38 through the IOCTL 36 to initiate activity causing the next data transfer.

If the data transfer is from the client process 10 to the hardware device 16, then the transfer server 46 signals an output helper thread 48 to cause it to cook data from the client buffers 24 to the shared memory 44 through the cooking methods 42. When data is ready, it is transferred from the shared memory 44 to the controller hardware 38. The output helper thread 48 notifies the client process 10 through the client I/O request 20 when the transfer is complete.

The process of transferring buffers of data repeats itself until the client process 10 issues a stop streaming command to the device driver 12 through the DriverProc 18 to terminate the transfer of data between the hardware device 16 and the client process 10. The DriverProc 18 then disables the transfer server 46 from issuing subsequent command for continued data transfer. Finally, the client process 10 issues an unprepare buffers command to the device driver 12, however no action is required since all access to the client buffers 24 was performed through the client context.

Again, it is significant to note that through the use of the present invention, the DMA controller 28, the system interrupt controller 30, and the kernel interrupt handler 32 of the kernel 14 are not employed in the data transfer. The advantage being that the use of DMAs and/or IRQs for this data transfer is eliminated.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A device driver for performing programmed input/output between at least one client process and at least one hardware device without reliance on DMA and IRQ resources of a personal computer running a Windows NT operating system, the device driver comprising:

means for processing commands from the at least one client process;

a helper thread for performing asynchronous activities on behalf of the at least one client process;

a polling process for polling a status from the at least one hardware device; and means of input/output control for issuing commands to the at least one hardware device.

2. A device driver for performing programmed input/output between at least one client process and at least one hardware device without reliance on DMA and IRQ resources of a personal computer running a Windows NT operating system, the device driver comprising:

means for processing commands from the at least one client process;

cooking methods for translation of data format;

shared memory for interprocess buffering;

an input helper thread for performing asynchronous activities on behalf of the at least one client process;

an output helper thread for performing asynchronous activities on behalf of the at least one client process;

a polling process for polling a status from the at least one hardware device; and means of input/output control for issuing commands to the at least one hardware device.

3. In a computer system, a device driver for performing programmed input/output between at least one client process and at least one hardware device, the device driver comprising:

a command processor to process commands from the at least one client process;

a helper thread to perform asynchronous activities on behalf of the at least one client process;

a polling process to poll from the at least one hardware device, said polling process wakened to perform said poll at a predetermined interval, said polling process put to sleep after performing said poll; and an input/output controller to issue commands to the at least one hardware device such that data transfer activity is accomplished without reliance on DMA and IRQ resources of the computer system.

4. The device driver of claim 3 wherein said computer comprises a personal computer.

5. The device driver of claim 4 wherein said computer comprises a personal computer running a Windows NT operating system.

6. In a computer system, device driver for performing programmed input/output between at least one client process and at least one hardware, the device driver comprising:

a command processor to process commands from the at least one client process;

a cooking method unit to translate data format;

a shared memory to store interprocess information;

an input helper thread to perform asynchronous activities on behalf of the at least one client process;

an output helper thread to perform asynchronous activities on behalf of the at least one client process;

a polling process to poll from the at least one hardware device, said polling process wakened to perform said poll at a predetermined interval, said polling process put to sleep after performing said poll; and an input/output controller to issue commands to the at least one hardware device such that data transfer activity is accomplished without reliance on DMA and IRQ resources of the computer system.

7. The device driver of claim 6 wherein said computer comprises a personal computer.

8. The device driver of claim 7 wherein said computer comprises a personal computer running a Windows NT operating system.

* * * * *